US012663608B2

(12) United States Patent
Hatakeyama

(10) Patent No.: US 12,663,608 B2
(45) Date of Patent: Jun. 23, 2026

(54) LENS BARREL AND CONTROL APPARATUS THAT PROVIDE A PLURALITY OF MODES THAT ARE SWITCHABLE

(71) Applicant: CANON KABUSHIKI KAISHA, Tokyo (JP)

(72) Inventor: Yasuhiro Hatakeyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 695 days.

(21) Appl. No.: 18/080,056

(22) Filed: Dec. 13, 2022

(65) Prior Publication Data

US 2023/0194830 A1     Jun. 22, 2023

(30) Foreign Application Priority Data

Dec. 20, 2021     (JP) ................................. 2021-205759

(51) Int. Cl.
*H04N 23/667* (2023.01)
*G02B 7/10* (2021.01)
*H04N 23/67* (2023.01)

(52) U.S. Cl.
CPC ........... *G02B 7/102* (2013.01); *H04N 23/667* (2023.01); *H04N 23/672* (2023.01)

(58) Field of Classification Search
CPC ........ G02B 7/08; G02B 7/102; H04N 23/663; H04N 23/667; H04N 23/672; H04N 23/6812; H04N 23/687
See application file for complete search history.

(56) References Cited

U.S. PATENT DOCUMENTS 5,815,745 A * 9/1998 Ohsawa .................... G02B 7/10
                                                              396/76
2015/0042867 A1* 2/2015 Shiono ..................... G02B 7/38
                                                              348/348

(Continued)

FOREIGN PATENT DOCUMENTS

CN          102565999 A      7/2012
JP        2004094201 A  *  3/2004

(Continued)

OTHER PUBLICATIONS

First Office Action issued in Chinese Appln. No. 202211614502.4 mailed Mar. 26, 2026.

*Primary Examiner* — Antoinette T Spinks

(74) *Attorney, Agent, or Firm* — ROSSI, KIMMS & McDOWELL LLP

(57) ABSTRACT

A lens barrel includes a detecting unit that detects a position of an optical element in an optical axis direction, a driving unit that drives so as to change the position of the optical element in the optical axis direction, and a memory that stores setting information about the position of the optical element in the optical axis direction. The lens barrel is switchable between a storage mode for storing setting information about a first position of the optical element in the memory, and a reproduction mode in which the driving unit transfers the position of the optical element to the first position. Setting information about a position of the optical element is repeatedly storable in the memory in the storage mode. Setting information about a position of the optical element is prohibited from being stored in the memory in the reproduction mode.

7 Claims, 4 Drawing Sheets

(56)            References Cited

U.S. PATENT DOCUMENTS

| | | | | |
|---|---|---|---|---|
| 2018/0052298 | A1* | 2/2018 | Sueoka | G02B 7/08 |
| 2023/0231990 | A1* | 7/2023 | Balcarek | H04N 17/002 |
| | | | | 348/180 |
| 2026/0006327 | A1* | 1/2026 | Masuda | H04N 23/675 |

FOREIGN PATENT DOCUMENTS

| | | | | |
|---|---|---|---|---|
| JP | 2004294932 | A | * | 10/2004 |
| JP | 4171980 | B2 | | 10/2008 |

* cited by examiner

LENS BARREL AND CONTROL APPARATUS THAT PROVIDE A PLURALITY OF MODES THAT ARE SWITCHABLE

BACKGROUND

Technical Field

One of the aspects of the disclosure relates to a lens barrel and a control apparatus.

Description of the Related Art

An interchangeable lens having a focus preset function has conventionally been known that calls a preset focus position in order to quickly and reliably focus on an object in an assumed scene during imaging sports scenes or the like. Japanese Patent No. ("JP") 4171980 discloses a configuration for setting and calling the focus position using a setting button provided on a release side of the camera and a call button provided in front of the lens.

The configuration disclosed in JP 4171980 may unintentionally overwrite another focus position on a set focus position. If the focus preset function is executed in such a case, an unintended focus position may be called and a scene to be captured may be missed.

SUMMARY

The disclosure provides a lens barrel and a control apparatus, each of which can suppress overwriting of a set focus position.

A lens barrel according to one aspect of the disclosure includes a detecting unit configured to detect a position of an optical element in an optical axis direction, a driving unit configured to drive so as to change the position of the optical element in the optical axis direction, and a memory configured to store setting information about the position of the optical element in the optical axis direction. The lens barrel is switchable between a storage mode for storing setting information about a first position of the optical element in the memory, and a reproduction mode in which the driving unit transfers the position of the optical element to the first position. Setting information about a position of the optical element is repeatedly storable in the memory in the storage mode. Setting information about a position of the optical element is prohibited from being stored in the memory in the reproduction mode.

A control apparatus according to another aspect of the disclosure is configured to control a lens barrel. The lens barrel includes a detecting unit configured to detect a position of an optical element in an optical axis direction, a driving unit configured to drive so as to change the position of the optical element in the optical axis direction, and a memory configured to store setting information about the position of the optical element in the optical axis direction. The lens barrel is switchable between a storage mode for storing setting information about a first position of the optical element in the memory, and a reproduction mode in which the driving unit transfers the position of the optical element to the first position. The control apparatus includes at least one processor, and a storage coupled to the at least one processor, the storage having instructions that, when executed by the processor, perform operations as an acquiring unit configured to acquire a mode set to the lens barrel, and a control unit configured to enable setting information about a position of the optical element to be repeatedly storable in the memory in the storage mode, and to prohibit setting information about a position of the optical element from being stored in the memory in the reproduction mode.

Further features of the disclosure will become apparent from the following description of exemplary embodiments with reference to the attached drawings.

DESCRIPTION OF THE EMBODIMENTS

Figure 1:
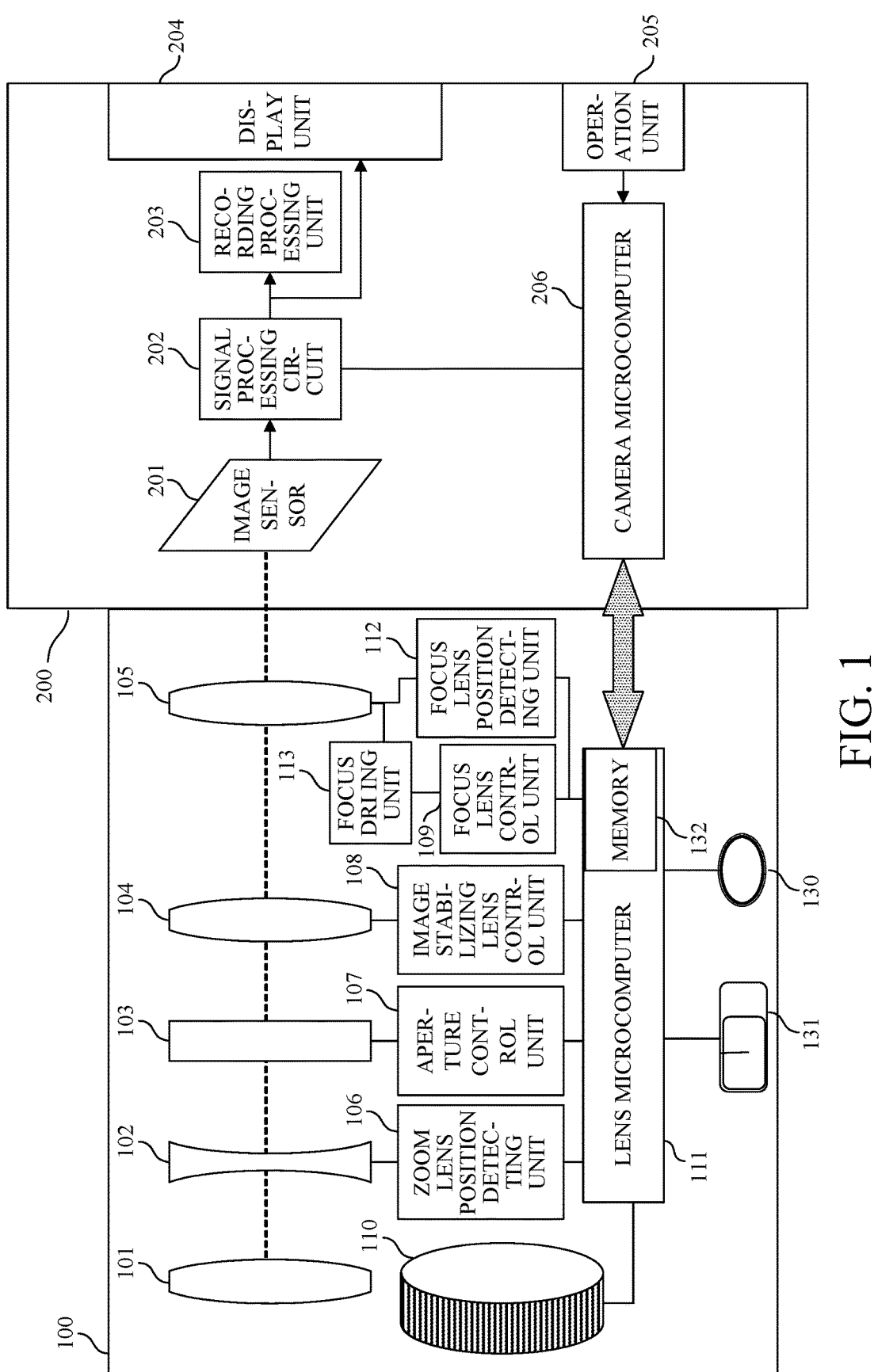
FIG. 1 is a block diagram of a camera system according to one embodiment of the disclosure.

Referring now to the accompanying drawings, a detailed description will be given of embodiments according to the disclosure. Corresponding elements in respective figures will be designated by the same reference numerals, and a duplicate description thereof will be omitted.

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

FIG. 1 is a block diagram of a camera system according to one embodiment of the disclosure. The camera system includes an interchangeable lens (lens barrel) 100 and a camera body 200.

The interchangeable lens 100 is mechanically and electrically connected to the camera body 200 via an unillustrated mount. The interchangeable lens 100 receives power from the camera body 200 via an unillustrated power supply terminal provided on the mount and controls a variety of actuators and a lens microcomputer 111, which will be described below, using the supplied power.

The camera body 200 includes an image sensor 201 including a phase difference AF sensor, etc., a signal processing circuit 202, a recording processing unit 203, a display unit 204, an operation unit 205, and a camera microcomputer 206. The camera body 200 communicates with the interchangeable lens 100 via an unillustrated communication terminal unit provided on the mount, and controls the interchangeable lens 100 by transmitting control commands.

The image sensor 201 photoelectrically converts an object image formed by an imaging optical system in the interchangeable lens 100 and outputs an electric signal (analog signal). An unillustrated A/D conversion circuit converts an analog signal from the image sensor 201 into a digital signal.

The signal processing circuit 202 performs various image processing for the digital signal from the A/D conversion circuit to generate a video signal, and outputs the generated video signal to the recording processing unit 203 and the display unit 204. The signal processing circuit 202 generates, based on the video signal, focus information that indicates a contrast state of the object image, that is, a focus state of the imaging optical system, and luminance information that indicates an exposure state.

The recording processing unit 203 stores as still or moving image data the video signal in an external memory or the like.

The display unit 204 includes a rear liquid crystal display unit, an electronic viewfinder, or the like of the camera body 200, and displays the video signal as a live-view image for confirmations of a composition, a focus state, and the like.

The camera microcomputer 206 controls the camera body 200 in accordance with inputs from an imaging instruction switch and various setting switches included in the operation unit 205. The camera microcomputer 206 transmits to the lens microcomputer 111 a control command regarding a focusing operation of a focus lens 105 according to focus information generated from outputs of unillustrated phase difference detection pixels on the image sensor 201.

The interchangeable lens 100 includes the imaging optical system including optical elements, a variety of actuators as driving units for driving the optical elements to change their positions, a variety of control units for controlling the actuators, a focus lens operation ring 110, and the lens microcomputer 111. The interchangeable lens 100 further includes a setting button 130, a switch (operation unit) 131 for switching various modes, and a memory (storage unit) 132.

The imaging optical system includes a field lens 101, a zoom lens 102 for magnification variation, an aperture (diaphragm) unit 103 for adjusting a light amount, an image stabilizing lens 104, and the focus lens 105 for focusing.

The lens microcomputer 111 controls operations of each unit within the interchangeable lens 100. The lens microcomputer 111 receives control commands transmitted from the camera body 200 and performs lens control corresponding to the control command. The lens microcomputer 111 receives a transmission request for lens data and a reception request for camera data, and transmits the lens data corresponding to the transmission request to the camera body 200 and receives data from the camera body 200.

The lens microcomputer 111 outputs commands to an aperture control unit 107 and a focus lens control unit 109 to drive the aperture unit 103 and the focus lens 105 in response to a command relating to light amount adjustment and a command relating to focusing among the control commands. The lens microcomputer 111 issues a command to the focus lens control unit 109 according to an operation amount of a focus lens operation ring 110 to drive the focus lens 105 and control the focusing operation.

The lens microcomputer 111 may have a function of acquiring a mode set to the interchangeable lens 100 and a function of prohibiting an operation from being executed other than the operation of the mode set as described below. A control apparatus including (at least one processor, and a storage coupled to the at least one processor, the storage (memory) having instructions that, when executed by the processor, perform operations as) an acquiring unit that acquires the mode set to the interchangeable lens 100 and a control unit that prohibits an operation from being executed other than the operation in the set mode may be provided as an apparatus separate from the interchangeable lens 100.

The zoom lens 102 moves along an optical axis indicated by a dashed line in the figure in a case where the user operates a zoom operation ring connected to an unillustrated zoom mechanism. Moving the zoom lens 102 changes a focal length of the imaging optical system for the magnification variation. A zoom lens position detecting unit 106 detects a zoom lens position using a position detection sensor such as a variable resistor, and outputs position data to the lens microcomputer 111. The output position data is used by the lens microcomputer 111 for controlling the generation of focal length information.

The aperture unit 103 includes a sensor such as aperture blades and a photo-interrupter. The state of the aperture blades is detected by the sensor and output to the lens microcomputer 111. The aperture control unit 107 outputs a driving signal in accordance with a command from the lens microcomputer 111 to drive an actuator such as a stepping motor and a voice coil motor. Thereby, the aperture unit 103 adjusts the light amount.

The image stabilizing lens 104 reduces image blur caused by camera shake or the like by moving in a direction orthogonal to the optical axis of the imaging optical system (shift operation). An image stabilizing lens control unit 108 outputs a driving signal to drive an image stabilizing actuator according to a command from the lens microcomputer 111 based on shake detected by an unillustrated shake sensor such as a vibration gyro. Thereby, image stabilizing processing for controlling a shift operation of the image stabilizing lens 104 is performed.

The focus lens 105 is movable along the optical axis indicated by the dashed line in FIG. 1. A focus position detecting sensor 112 such as a photo-interrupter detects the position of the focus lens 105 and outputs position information about the focus lens 105 to the lens microcomputer 111. The focus lens control unit 109 outputs a driving signal in response to a command from the lens microcomputer 111 to drive the focus driving unit 113 and move the focus lens 105 for focusing.

The focusing operation by the focus lens 105 includes autofocus (referred to as AF hereinafter) for automatic focusing and manual focus (referred to as MF hereinafter) for manual focusing. In addition, there is a focus preset that moves the focus lens 105 to a preset focus position, that is, shifts the focus lens 105 to a first position.

In the AF, the camera microcomputer 206 calculates an in-focus position of the focus lens 105 based on the focus information generated from the outputs of the phase difference detection pixels on the image sensor 201, and sends a control command regarding focusing to the lens microcomputer 111. In response to the control command, the lens microcomputer 111 issues a command to the focus lens control unit 109 to drive the focus driving unit 113 and control the focusing operation.

In the MF, the lens microcomputer 111 issues a command to the focus lens control unit 109 according to the operation amount of the focus lens operation ring 110 to drive the focus driving unit 113 and control the focusing operation.

First Embodiment

Figure 2A:
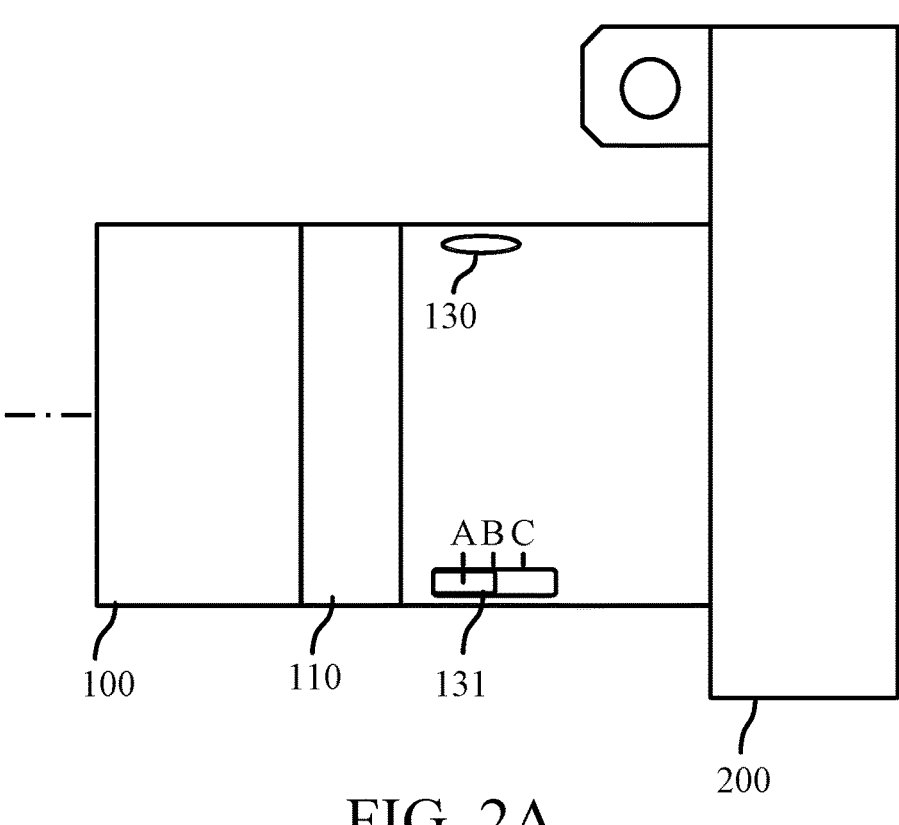
FIGS. 2A to 2C are schematic diagrams of a camera system according to a first embodiment.
Figure 2B:
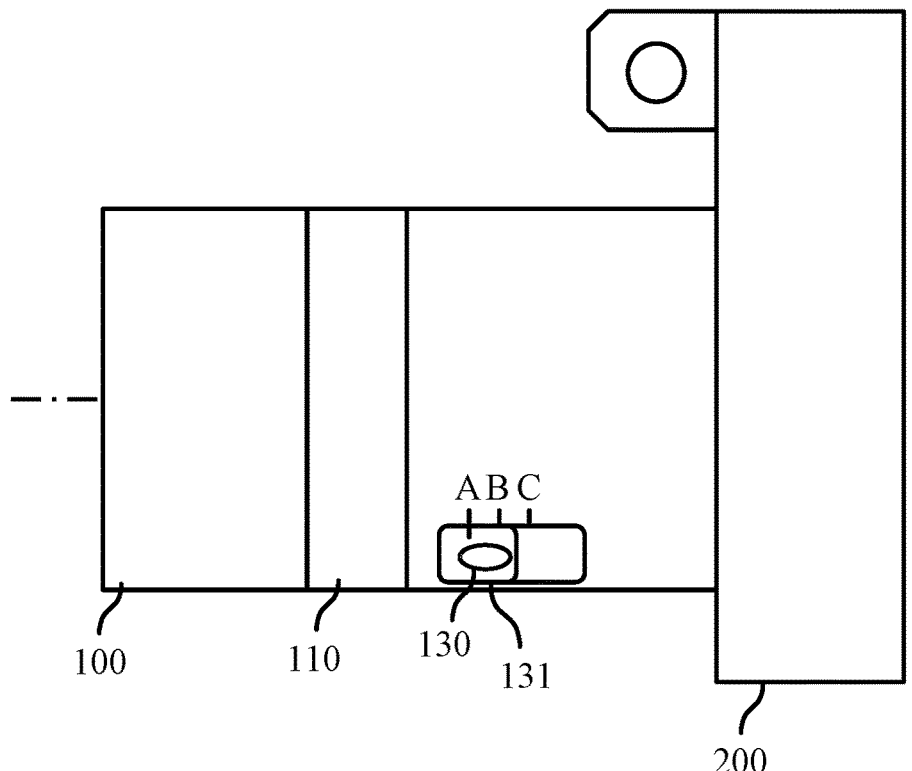
Figure 2C:
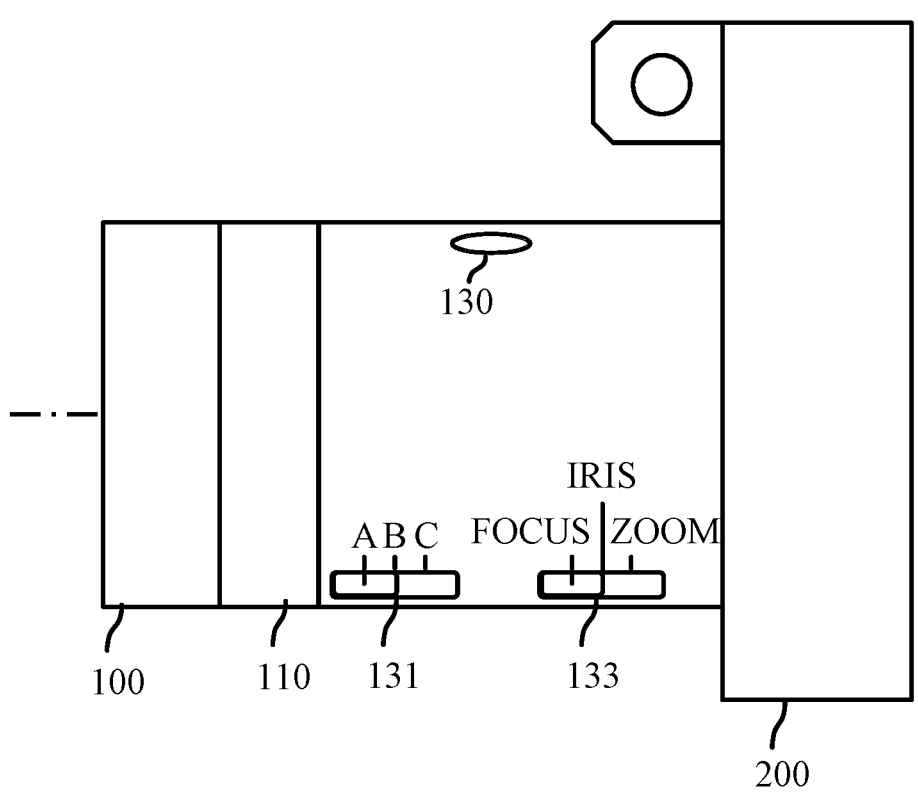

Referring now to FIGS. 2A to 2C, a description will be given of focus preset according to this embodiment. FIGS. 2A to 2C are schematic diagrams of the camera system according to this embodiment, and are top views of the camera system illustrated in FIG. 1.

As illustrated in FIG. 2A, the setting button 130 and the switch 131 are disposed on the outer circumference of the interchangeable lens 100. The switch 131 is movable along the optical axis, and is operated so as to be positioned at positions indicating marks "A," "B," and "C." In this embodiment, the function is switched according to the position of the switch 131, and the function corresponding to the position of the switch 131 is executed by operating the setting button 130.

In this embodiment, in a case where the switch 131 is located at the position indicating the mark "A," the interchangeable lens 100 is in a function execution mode for executing a function arbitrarily selected by the user. In the function execution mode, in a case where the lens microcomputer 111 recognizes the operation of the setting button 130, the lens microcomputer 111 transmits operation information to the camera microcomputer 206. The camera microcomputer 206 executes a pre-assigned custom function operation based on the operation information. The custom function operation includes, for example, ON/OFF switching of the AF mode, ON/OFF switching of electronic zoom, start/stop of video recording, and the like.

In a case where the switch 131 is located at the position indicating the mark "B," the interchangeable lens 100 is in a storage mode as a function assigned to the mark "B". In the storage mode, in a case where the lens microcomputer 111 recognizes the operation of the setting button 130, the focus position setting operation is executed. More specifically, the user operates the setting button 130 after moving the focus position to an arbitrary position using the AF or MF. Thereafter, in a case where the setting button 130 is operated in the storage mode, the lens microcomputer 111 acquires the position information about the focus lens 105 from the focus position detecting sensor 112 and stores the acquired position information in the memory 132. In this embodiment, in the storage mode, the position information about the focus lens 105 acquired from the focus position detecting sensor 112 is referred to as setting information about the position of the focus lens 105. In the storage mode, it is possible to repeatedly store the setting information about the position of the focus lens 105 in the memory 132.

In a case where the switch 131 is located at the position indicating the mark "C," the interchangeable lens 100 is in a reproduction mode as a function assigned to the mark "C." In the reproduction mode, in a case where the lens microcomputer 111 recognizes the operation of the setting button 130, the calling operation of the focus position is executed. In the reproduction mode, in a case where the setting button 130 is operated, the lens microcomputer 111 acquires setting information about the focus lens 105 from the memory 132. Thereafter, the lens microcomputer 111 issues a command to the focus lens control unit 109 to drive the focus lens 105 to reach the set position.

In this embodiment, the storage mode and the reproduction mode exist exclusively. That is, this embodiment prohibits an operation from being executed other than the operation of the mode corresponding to the position of the switch 131. More specifically, the reproduction mode prohibits the execution of the focus position setting operation, that is, storing the setting position of the focus lens 105 in the memory 132. This configuration can suppress overwriting of the set focus position caused by an erroneous operation, because the user completes the setting operation of the focus position and switches the switch 131. Thereby, the focus position that is set for the focus preset function can be reliably called.

In this embodiment, in the case where the switch 131 is located at the position indicating the mark "A," the interchangeable lens 100 is in the mode for executing a general-purpose function other than the focus preset. Thereby, even a user who does not use the focus preset can effectively use the setting button 130.

There is a problem that a three-value switch such as the switch 131 has difficulty in stopping at a middle position. Accordingly, this embodiment sets the function assigned to the middle position of the switch 131 to the storage mode in which no operation is performed during imaging. By setting the functions assigned to the ends of the operation area of the switch 131 to the function execution mode and the reproduction mode, which are operated during imaging, quick switching during imaging can be easily performed.

The setting button 130 may be provided on the switch 131 as illustrated in FIG. 2B. Since this configuration enables the setting button 130 and the switch 131 to be operated without changing the position of the hand, switching among a variety of modes and a function execution can be more quickly operated.

As illustrated in FIG. 2C, a parameter switch 133 may be provided for instructing which parameter of focus, zoom, and F-number (aperture value) is to be processed. In a case where the parameter switch 131 is located at a position indicating a mark "FOCUS," operating the setting button 130 can execute the focus position setting operation and the focus position calling operation. In a case where the parameter switch 131 is located at a position indicating a mark "IRIS," operating the setting button 130 can execute the F-number setting operation and the F-number calling operation. In a case where the parameter switch 131 is located at a position indicating a mark "ZOOM," operating the setting button 130 can execute the zoom position setting operation and the zoom position calling operation. Alternatively, the camera body 200 may have a function equivalent to that of the parameter switch 133 without providing the parameter switch 133 to the interchangeable lens 100.

Second Embodiment

Figure 3:
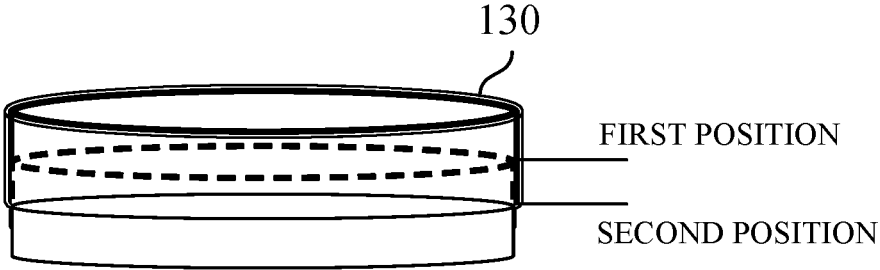
FIG. 3 is a schematic diagram of an operation button according to a second embodiment.

Referring now to FIG. 3, a description will be given of focus preset according to this embodiment. FIG. 3 is a schematic diagram of an operation amount of a setting button 130. The basic operation of the focus preset according to this embodiment is similar to that of the first embodiment, but the configuration of the setting button 130 is different from that of the first embodiment. This embodiment will describe a configuration different from that of the first embodiment, and omit a description of the similar configuration.

In this embodiment, as illustrated in FIG. 3, the setting button 130 is operable between a first position with a shallow operation amount and a second position with a deep operation amount. In a case where the setting button 130 is located at the first position, the calling operation of the focus position or a custom function operation is performed. In a case where the setting button 130 is located at the second position, the setting operation of the focus position is performed.

Even this embodiment prohibits an operation from being executed other than the operation of the mode according to the position of the switch 131. For example, in a case where the switch 131 is located at the position indicating the mark "C," that is, in a case where the interchangeable lens 100 is set to the reproduction mode, no focus position setting operation is performed even if the setting button 130 is operated to the second position. In a case where the switch 131 is located at the position indicating the mark "B," that is, in a case where the interchangeable lens 100 is set to the storage mode, no focus position calling operation is performed even if the setting button 130 is operated to the first position. This configuration enables a user who forgets to operate the switch 131 to notice that the switch 131 has been left unswitched, because the operation of the setting button 130 to the first position does not execute the calling operation of the focus position. In addition, this configuration can suppress overwriting of the focus position caused by an erroneous operation

Third Embodiment

Figure 4:
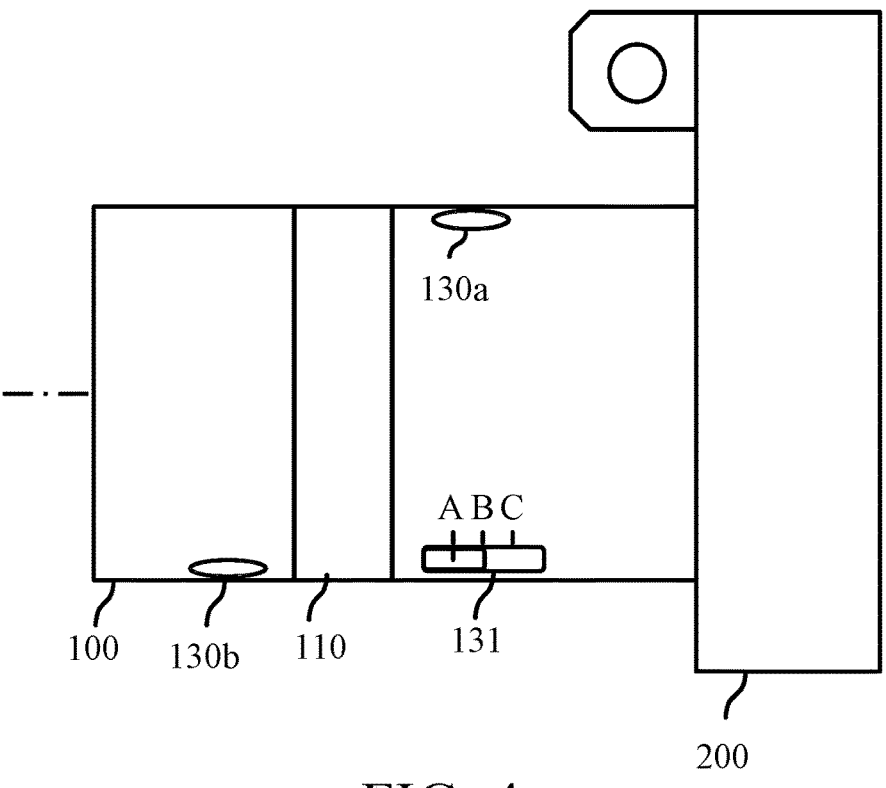
FIG. 4 is a schematic diagram of a camera system according to a third embodiment.

Referring now to FIG. 4, a description will be given of focus preset according to this embodiment. FIG. 4 is a schematic diagram of a camera system of this embodiment, and is a top view of the camera system illustrated in FIG. 1. The basic operation of the focus preset according to this embodiment is similar to that of the first embodiment, but a configuration of the setting button 130 is different from that of the first embodiment. This embodiment will describe a configuration different from that of the first embodiment, and omit a description of the similar configuration.

In this embodiment, the setting button 130 includes a first setting button 130a and a second setting button 130b. Operating the first setting button 130a can execute the calling operation of the focus position or the custom function operation. Operating the second setting button 130b can execute the setting operation of the focus position.

Even this embodiment prohibits an operation from being executed other than the operation of the mode according to the position of the switch 131. For example, in a case where the switch 131 is located at the position indicating the mark "C," that is, in a case where the interchangeable lens 100 is set to the reproduction mode, no setting operation of the focus position is executed even if the first setting button 130a is operated. In a case where the switch 131 is located at the position indicating the mark "B," that is, in a case where the interchangeable lens 100 is set to the storage mode, no calling operation of the focus position is executed even if the second setting button 130b is operated. This configuration can dispose the operation button at a position that are easy to operate. For example, since the setting button 130b for setting the focus position is used for various settings, it may be placed at a position that is easy to operate by a right hand while the focus lens operation ring 110 is operated by a left hand. The setting button 130a for calling the focus position and for executing the custom function operation may be disposed at a position that is easy to operate while the camera system is supported near a center-of-gravity position.

Fourth Embodiment

Figure 5:
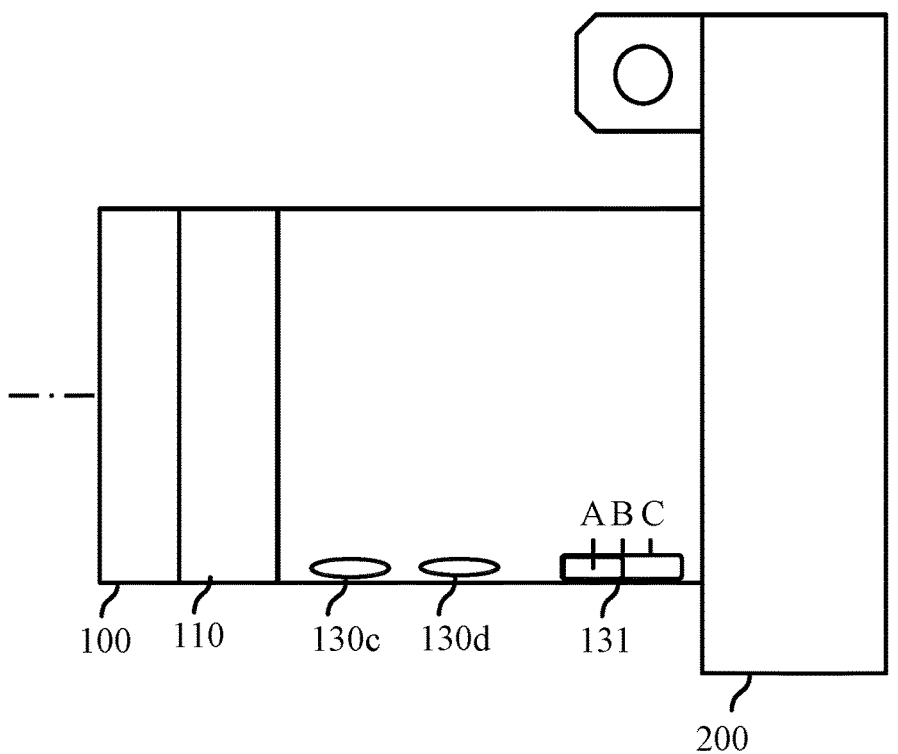
FIG. 5 is a schematic diagram of a camera system according to a fourth embodiment.

Referring now to FIG. 5, a description will be given of focus preset according to this embodiment. FIG. 5 is a schematic diagram of a camera system according to this embodiment, and is a top view of the camera system illustrated in FIG. 1. The basic operation of the focus preset of this embodiment is similar to that of the first embodiment, but a configuration of the setting button 130 is different from that of the first embodiment. This embodiment will describe a configuration different from that of the first embodiment, and omit a description of the similar configuration.

In this embodiment, the setting button 130 includes a third setting button 130c and a fourth setting button 130d. The third setting button 130c is operated in executing any one of the first focus position calling operation, the first focus position setting operation, and the custom function operation. The fourth setting button 130d is operated in executing one of the second focus position calling operation and the second focus position setting operation.

In this embodiment, for example, in a case where the switch 131 is located at the position indicating the display "B", that is, in a case where the interchangeable lens 100 is set to the storage mode, operating the third setting button 130c can execute the first focus position setting operation. Operating the fourth setting button 130d can execute the second focus position setting operation. In a case where the switch 131 is located at the position indicating the mark "C," that is, in a case where the interchangeable lens 100 is set to the reproduction mode, operating the third setting button 130c can execute the calling operation of the first focus position. Operating the fourth setting button 130d can execute the calling operation of the second focus position. This configuration can collectively control the setting operation and calling operation of a plurality of focus positions, and suppress overwriting of the focus position caused by an erroneous operation even in a case where a plurality of focus positions are set.

Each of the above embodiments can provide a lens barrel and a control apparatus, each of which can suppress overwriting of the set focus position.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-205759, filed on Dec. 20, 2021, which is hereby incorporated by reference herein in its entirety.

What is claimed is:

1. A lens barrel comprising:
a unit sensor configured to detect a position of an optical element in an optical axis direction;
an actuator configured to drive the optical element to change the position of the optical element in the optical axis direction;
a memory configured to store setting information about the position of the optical element in the optical axis direction; and
a switch switchable between a first position, a second position, and a third position, wherein:
    the first position sets a function execution mode in which a function arbitrarily selected by a user is executed;
    the second position sets a storage mode in which setting information about a first position of the optical element is stored in the memory; and
    the third position sets a reproduction mode in which the actuator is driven to transfer the optical element to the first position,
wherein the setting information about the position of the optical element is:
    repeatedly storable in the memory in the storage mode; and
    prohibited from being stored in the memory in the reproduction mode.

2. The lens barrel according to claim 1, further comprising:
an operation button common to the storage mode and the reproduction mode,
wherein according to an operation of the operation button:
    the first position of the optical element is stored in the memory in the storage mode; and
    the actuator drives the optical element to the first position in the reproduction mode.

3. The lens barrel according to claim 2,
wherein the function is executed in the function execution mode according to the operation of the operation button.

4. The lens barrel according to claim 2, wherein, in the reproduction mode, operating the operation button does not store in the memory the setting information about the position of the optical element in the optical-axis direction.

5. The lens barrel according to claim 1, further comprising:
a first operation button; and
a second operation button,
wherein the first position of the optical element is stored in the memory according to an operation of the first operation button in the storage mode, and
wherein the actuator drives the optical element to the first position according to the operation of the second operation button in the reproduction mode.

6. The lens barrel according to claim 5, wherein, in the reproduction mode, operating the first operation button does not store in the memory the setting information about the position of the optical element in the optical-axis direction.

7. A control apparatus configured to control a lens barrel that includes:
a sensor configured to detect a position of an optical element in an optical axis direction;
an actuator configured to drive the optical element-so as to change the position of the optical element in the optical axis direction;
a memory configured to store setting information about the position of the optical element in the optical axis direction; and
a switch switchable between a first position, a second position, and a third position, wherein:
    the first position sets a function execution mode in which a function arbitrarily selected by a user is executed;
    the second position sets a storage mode in which setting information about a first position of the optical element is stored in the memory; and
    the third position sets a reproduction mode in which the actuator is driven to transfer the optical element to the first position,
the control apparatus comprising:
a storage storing instructions; and
at least one processor that executes the instructions to:
    acquire a mode set to the lens barrel; and
    enable the setting information about the position of the optical element to be repeatedly storable in the memory in the storage mode; and
    prohibit the setting information about the position of the optical element from being stored in the memory in the reproduction mode.

* * * * *